(No Model.) 2 Sheets—Sheet 1.

W. M. BROWN.
BLOW PIPE.

No. 405,528. Patented June 18, 1889.

WITNESSES:
S. B. Brewer,
J. F. Harris

INVENTOR:
Walter Morton Brown.

(No Model.) 2 Sheets—Sheet 2.

W. M. BROWN.
BLOW PIPE.

No. 405,528. Patented June 18, 1889.

Witnesses:
S. B. Bruner,
H. V. Scattergood.

Inventor:
Walter Morton Brown

UNITED STATES PATENT OFFICE.

WALTER MORTON BROWN, OF ALBANY, NEW YORK.

BLOW-PIPE.

SPECIFICATION forming part of Letters Patent No. 405,528, dated June 18, 1889.

Application filed May 13, 1887. Serial No. 238,109. (No model.)

*To all whom it may concern:*

Be it known that I, WALTER MORTON BROWN, a citizen of the United States, residing at Albany, in the county of Albany and State of New York, have invented certain new and useful Improvements in Blow-Pipes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to produce the greatest amount of heat from the gas or inflammable vapor or mixture of air and gas consumed, and to provide an apparatus whereby any desired number of blow-pipe flames may be produced simultaneously.

Figure 1:
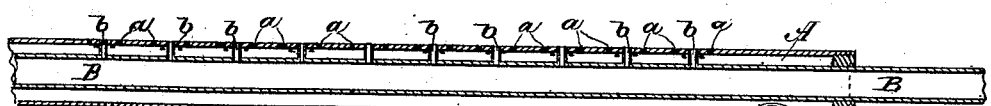
Figure 2:
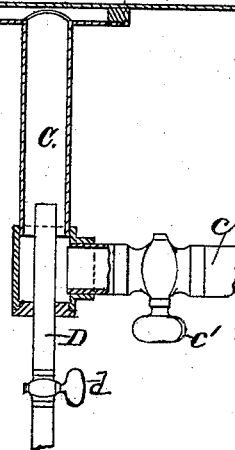
Figure 2:
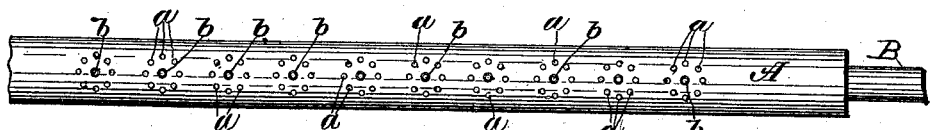
Figure 3:
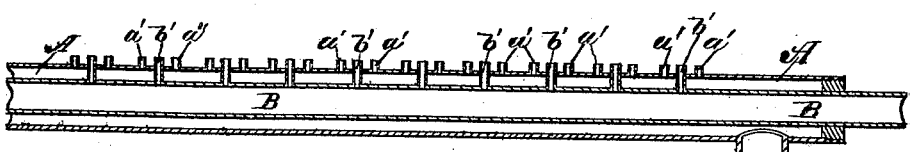
Figure 4:
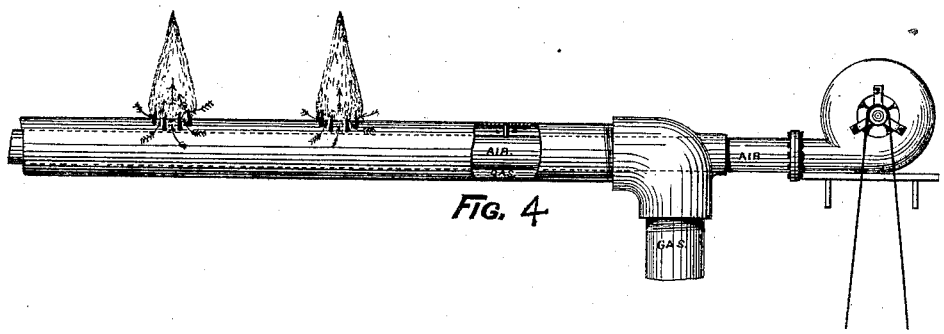

Figure 1 represents a sectional view of one form of my invention; Fig. 2, a plan view thereof; Fig. 3, a sectional view of another form of my invention, wherein burner-tips instead of perforations are shown. Fig. 4 shows one of my burners in full operative construction, showing one means that may be used for creating an air-blast. The arrows show the directions of the air-currents, the arrow rising vertically from the central perforation showing the forced air-current and the arrows pointing between the several flames showing the superinduced air-currents.

In Fig. 1 A represents a conduit or pipe to convey gas or inflammable vapor, or a mixture of air and gas, which may or may not be under artificial pressure, said conduit or pipe A having openings $a$, whereat gas or inflammable vapor, or a mixture of air and gas, may be burned.

B represents a conduit or pipe of less diameter than pipe A, said conduit or pipe B being introduced into conduit or pipe A, said conduit or pipe B having tips $b$, whereat and through which air or any gas or gaseous compound under pressure may be discharged, the exit or upper ends of tips $b$ passing through the shell of the conduit or pipe A, forming a tight joint, and passing through said shell of pipe A at such a point that when gas or air or any gaseous compound under pressure flows through conduit or pipe B and is discharged from the exit ends of the tips $b$ said air or gas so discharged from said tips $b$ will flow within the circle or space formed by the gas-flames burning from the perforations $a\ a\ a$, and impinge upon the inner surface of the flames at a point somewhat above the point where the flames begin to form at the orifices of the perforations $a\ a\ a$, and produce what is commonly called and known as a "blow-pipe flame."

C represents a pipe connected with and communicating with the interior of conduit or pipe A, and $c$ a main gas or inflammable-vapor pipe to supply gas or inflammable vapor to pipes C and A, and D a pipe entered in the lower end of pipe C, (in the drawings shown as entering a T-piece turned upon the lower end of pipe C,) and extending into said pipe C to a point beyond the point where the main supply gas or vapor pipe $c$ enters the pipe C, said pipe D being for the purpose of supplying air under pressure, or any gaseous compound under pressure, to conduit or pipe A.

$c'$ represents a cock in pipe $c$ by which the supply of gas or inflammable vapor or mixture of gas and air may be regulated, and $d$ a cock in pipe D whereby the flow of air or gaseous compound under pressure may be regulated or wholly shut off.

Fig. 2 shows a plan view of Fig. 1, and in Fig. 2 is shown the manner in which I preferably distribute the openings or perforations $a$ in conduit or pipe A, but the said openings or perforations may or may not be set in circles, as may be desired. In Fig. 2 $b$ shows the exit ends of the tips $b$ passed through the shell of the conduit or pipe A.

In Fig. 3 is shown another blow-pipe having burners or tips $a'\ a'\ a'$, whereat gas or inflammable vapor, or a mixture of gas and air, may be burned, and air-tips $b'\ b'\ b'$, communicating with conduit or pipe B, and passing through the shell of pipe A, rising to a level with the tops of the burners $a'\ a'\ a'$. I preferably construct the tips $b'\ b'\ b'$ so that their upper or exit ends shall rise to the level of the burner-tips $a'\ a'\ a'$, but they may rise above or be placed below the level of the tips $a'\ a'\ a'$, if desired.

Similar letters refer to similar parts throughout the several views.

The operation of my invention is as follows: Gas or inflammable vapor, or a mixture of air and gas, which may or may not be under artificial pressure, being allowed to flow into pipe $c$ and through the cock $c'$, it flows into pipe C at a point below the upper or exit end of pipe D, and passing through pipe C it flows into conduit or pipe A and out of the perforations $a\ a\ a$, or the burners $a'\ a'\ a'$, and may there be ignited. Air or oxygen, or other gaseous compound, under artificial pressure, being allowed to flow into pipe D and through the cock $d$, it passes into pipe C, causing an intimate and thorough mixture of the contents of pipes D and C, and tends to draw or force forward the contents of pipe $c$. By use of pipe D the gas or vapor in pipe C may be diluted or impoverished to any desired extent. Air under pressure being forced through pipe or conduit B, it flows out through the air-tips $b\ b\ b$, or the tips $b'\ b'\ b'$, and impinges upon the inner surface of the circle of flames burning at perforations $a\ a\ a$ or $a'\ a'\ a'$, and produces what is known as a "blow-pipe flame," and as many of such flames as may be desired simultaneously.

The peculiarity of the invention and wherein it differs from all other forms of blow-pipes is in this, to wit: that the gas-perforations being set in a circle or in any manner approximating that form, and there being a space between the several perforations, when the air is forced out of the central perforation it creates a more or less strong upper current of air, and this upper current superinduces other air-currents from the outside of the cluster of flames burning at the gas-perforations, and as there is no opportunity for these superinduced currents to enter the circle of gas-flames directly from underneath the circle—i. e., on a vertical line with the air-current forced from the central air-jet—these superinduced air-currents are compelled to flow through the openings between the flames and join the forced upper and central current at a point above the surface of the gas-pipe, and thus the several gas-flames burning at the circle of gas-perforations are cross-cut by as many superinduced air-currents as there are openings between the flames, and thus the flames are supplied with a much greater amount of air, and consequently oxygen, than would be possible if only the central forced air-current was blown into the center of an annular gas-flame having no openings through its sides. This manner of arranging the gas flames and perforations also has another advantage—i. e., the flame as a whole as produced is not a torn or ragged flame and does not flutter, nor is it either a reducing or oxidizing flame, as it would be if the central forced air-jet were the only one that came in contact with the flame, as the superinduced air-currents control the action of the forced air-current by joining with it, and produce a seemingly spiral motion in the forced current. If the gas-perforations are drilled through the gas-pipe at a slight angle, so that the gas-jets will be given a direction inward, and so that they shall thus be forced to form in shape of a cone above the central air-perforation, the result will be practically the same, but intensified.

If the tips shown in the drawings are raised too high above the surface of the gas-pipe, the peculiar and desirable results of the invention will be lost, as there must not be so much space between the bottoms or lower portions of the flames and the surface of the gas-pipe as to allow the superinduced air-currents to join the forced air-current at a point below the gas-flames; but they must be drawn first through the openings between the gas-flames and along the surface of the gas-pipe, after which they may be left to join the central forced current at will. This difference may be fully illustrated by placing two gas-jets near to each other and so that they will throw their flames longitudinally and into each other. If a forced air-jet be now placed under these two flames, or under any number of them set in a circle, the only result obtained will be a common blow-pipe flame, which will be ragged, torn, and fluttering, and either an oxidizing or reducing flame, in accordance with the amount of air used to create the air-blast. It is necessary, therefore, that the several gas-flames composing the circle of flames have their bases either directly upon the surface of the gas-pipe, or, if burners or nipples are used instead of perforations, that the nipples be allowed to rise but very little above the top surface of the gas-pipe. The gas-apertures may be set in any other form than that of a circle—as in squares, oblongs, stars, &c.—if desired.

The main difference between this form of blow-pipe and all others lies in clustering the apertures whereat the gas is burned and in the effect produced upon the flame by thus clustering said apertures and by causing a jet or jets of air or other gaseous matter to impinge upon the inside surface of the ring of flames. When the mixed gas and air is allowed to escape from the apertures or perforations $a$ or the burner-tips $a'$, it forms as many small distinct jets of gas as there are apertures or burner-tips in the cluster, and when ignited produces as many distinct gas-flames as there are apertures or burner-tips. When the air is forced through pipe or conduit B and out of the tips $b$ or $b'$, it flows into the circle or opening formed by the clustered gas-flames and impinges upon the inside surface of said flames. This produces a result most desirable and not hitherto attained. As the blast of air impinges upon the inner surface of said flames, there is produced short, sharp-pointed, and sharply-defined emerald-green flames, in number equal to the number of apertures or burner-tips in the cluster, and beginning from a point a very short distance from the base of these emerald-green flames is formed a solid violet-colored flame, which extends beyond and partly surrounds the green flames. The clustering of the perforations, apertures, or burner-tips in the manner shown in the drawings or in any similar manner, whatever form the cluster may be made to take, thus producing a number of small gas-flames near together and then forcing a blast of air into the center of the cluster (not into the center of each flame) produce the separate and distinct emerald-green flames and in combination therewith the violet-colored flame, from which greater heat can be produced and utilized than from the sum total of the heat possible to be produced from the several gas-flames burned without being so clustered.

Having described my invention, so that any person skilled in the art to which it appertains may make and use the same, what I claim as my invention, and desire to secure by Letters Patent, is—

A gas-conduit having clustered jet-gas perforations and an air-conduit fixed in the bore of said gas-conduit, the air-conduit having hollow nipples leading from the interior of said air-conduit and passing through the shell of the gas-conduit, the exit ends of said hollow nipples terminating within the space formed by said clustered gas-perforations, substantially as described.

In testimony whereof I affix my signature in presence of two witnesses.

WALTER MORTON BROWN.

Witnesses:
JULIUS F. HARRIS,
JOHN S. WOLFE.